US012716912B2

(12) United States Patent
Dwyer et al.

(10) Patent No.: US 12,716,912 B2
(45) Date of Patent: Aug. 25, 2026

(54) ACCELEROMETER WITH PROOF MASS DISPLACEMENT REDUCTION FEATURE

(71) Applicant: Honeywell International Inc., Charlotte, NC (US)

(72) Inventors: Paul W. Dwyer, Seattle, WA (US); Thomas Campbell, Burien, WA (US); Clifford T. Molaskey, St. Petersburg, FL (US)

(73) Assignee: Honeywell International Inc., Charlotte, NC (US)

( * ) Notice: Subject to any disclaimer, the term of this patent is extended or adjusted under 35 U.S.C. 154(b) by 259 days.

(21) Appl. No.: 18/740,210

(22) Filed: Jun. 11, 2024

(65) Prior Publication Data

US 2025/0377376 A1 Dec. 11, 2025

(51) Int. Cl.

*G01F 15/12* (2006.01)
*G01P 15/125* (2006.01)
*G01P 15/08* (2006.01)

(52) U.S. Cl.

CPC ...... *G01P 15/125* (2013.01); *G01P 2015/084* (2013.01); *G01P 2015/0871* (2013.01)

(58) Field of Classification Search

None

See application file for complete search history.

(56) References Cited

U.S. PATENT DOCUMENTS 3,901,086 A * 8/1975 Griffiths ................ G01P 15/132 73/514.17
5,952,575 A * 9/1999 Foote .................... G01P 15/132 73/514.21
9,094,027 B2 * 7/2015 Tao .......................... H03B 5/30
9,234,755 B2 * 1/2016 Prandi .................... G01C 19/56
9,250,261 B2 2/2016 Lin et al.
9,541,396 B2 1/2017 Bhandari
9,644,961 B2 5/2017 Aaltonen
9,689,889 B1 6/2017 Casiraghi et al.
10,180,445 B2 * 1/2019 Dwyer .................. G01P 15/125
10,481,672 B1 * 11/2019 Griffin .................. G01P 15/097

(Continued)

FOREIGN PATENT DOCUMENTS

CN 114280330 A 4/2022

OTHER PUBLICATIONS

Li et al., “A low-noise class AB amplifier fabricated by 180 nm BCD process for servo circuit of quartz flexible accelerometer”, Microelectronics Journal, vol. 145, Mar. 2024, 9 pp.

*Primary Examiner* — Eric S. McCall
*Assistant Examiner* — Nigel H Plumb
(74) *Attorney, Agent, or Firm* — Shumaker & Sieffert, P.A.

(57) ABSTRACT

An accelerometer system comprising: a first magnetic assembly comprising a first pole piece and a first magnet; a second magnetic assembly comprising a second pole piece and a second magnet; a proof mass between the first magnetic assembly and the second magnetic assembly; a first coil disposed around the first pole piece; and a second coil disposed around the second pole piece; and processing circuitry configured to: cause a first current to flow through the first coil to apply a first Lorentz force to the proof mass; cause a second current to flow through the second coil to apply a second Lorentz force to the proof mass; and limit a maximum amplitude of the first current and the second current for at least a threshold period of time.

20 Claims, 5 Drawing Sheets

(56) References Cited

U.S. PATENT DOCUMENTS

| | | | | |
|---|---|---|---|---|
| 11,249,106 | B2 * | 2/2022 | Fell | G01P 1/00 |
| 11,275,098 | B2 * | 3/2022 | Dwyer | G01P 15/132 |
| 2019/0242925 | A1 * | 8/2019 | Malvern | G01P 1/006 |
| 2024/0118309 | A1 * | 4/2024 | Dwyer | G01P 1/023 |

* cited by examiner 224C
226B
205A
205B
224D 108A
220A
110A
110B
220B
108B
222A
222B
201
211A
211B
222A
222B
214A
106A
204
106B
214B
232
224A
226A
204
104
224B
234
100

Figure 3:
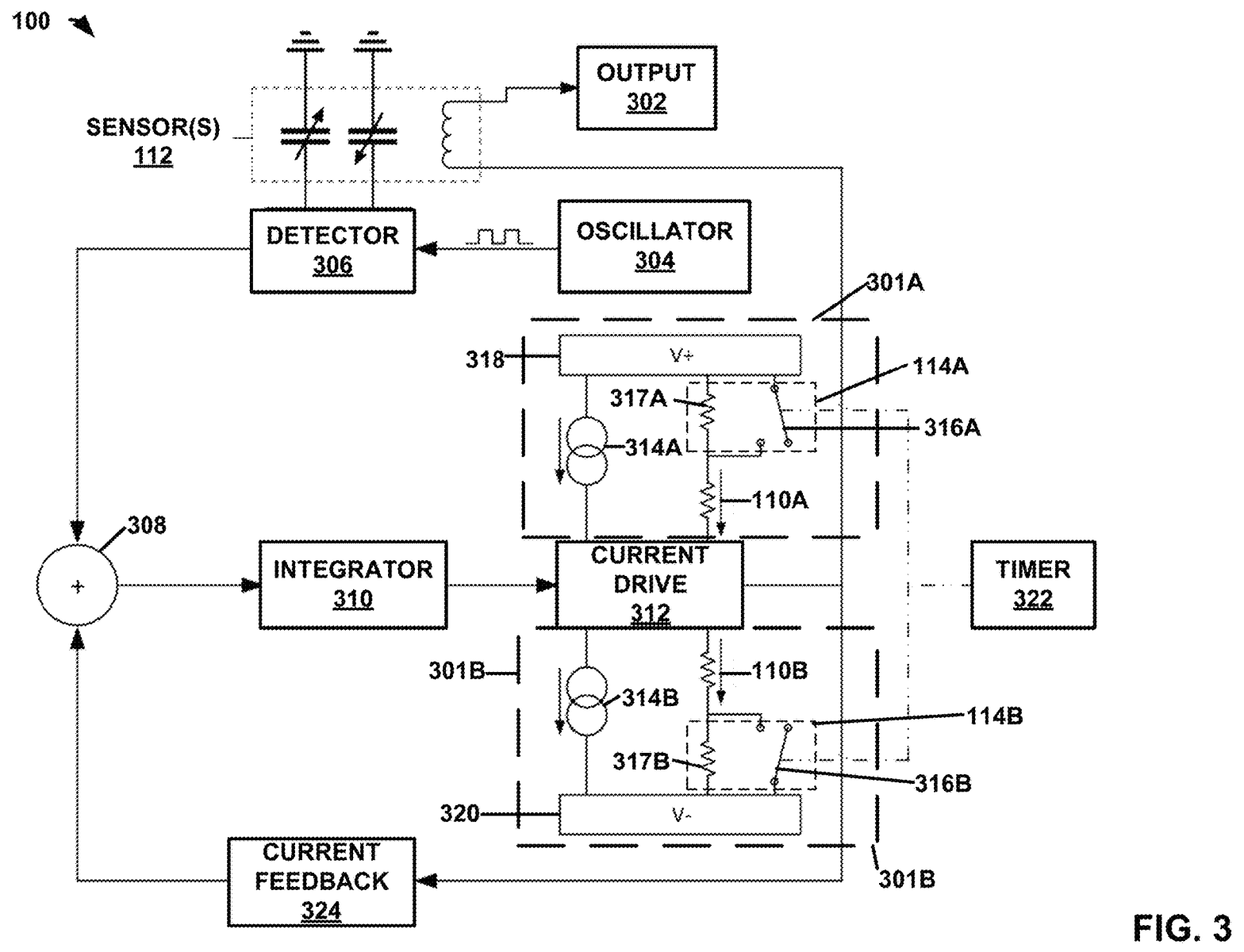

100

OUTPUT 302

OSCILLATOR 304

DETECTOR 306

SENSOR(S) 112

308

INTEGRATOR 310

CURRENT DRIVE 312

TIMER 322

CURRENT FEEDBACK 324

400
i(2)
402
CURRENT
AMPLITUDE
(A)
406
i(1)
t(0)
404
t(1)
TIME (S)

500
d(MAX)
d(1)
506
502
DISTANCE
(mm)
504
0
t(0)
404
t(1)
TIME (S)

ACCELEROMETER WITH PROOF MASS DISPLACEMENT REDUCTION FEATURE

TECHNICAL FIELD

This disclosure relates to accelerometers.

BACKGROUND

Accelerometers function by detecting a displacement of a proof mass under inertial forces. Some accelerometers include a capacitive pick-off system. For example, electrically conductive material (e.g., a capacitor plate) may be deposited on the upper surface of the proof mass, and similar electrically conductive material may be deposited on the lower surface of the proof mass. An acceleration or force applied along the sensitive axis of the accelerometer causes the proof mass to deflect either upwardly or downwardly causing the distance (e.g., a capacitive gap) between the pick-off capacitance plates and upper and lower non-moving members to vary. This variance in the capacitive gap causes a change in the capacitance of the capacitive elements, which is representative of the displacement of the proof mass along the sensitive axis. The change in the capacitance may be used as a displacement signal, which may be applied to a servo system that includes one or more electromagnets (e.g., a force-rebalancing coil) to return the proof mass to a null or at-rest position.

SUMMARY

In general, the disclosure is directed to devices, systems, and techniques for reducing the magnitude of displacement of a proof mass from a null position within the accelerometer system. During a startup procedure of the accelerometer system, electric currents flow through the coils within the accelerometer system which, when interacting with Magnetic flux within the accelerometer system, apply Lorentz forces on the proof mass within the accelerometer system. The initial application of Lorentz forces on the proof mass may cause the proof mass to at least temporarily displace from a null position within the accelerometer. In some examples, the displacement of the proof mass from the null position may lead to unintended contact between the proof mass or portions of the accelerometer system coupled to the proof mass (e.g., sensors disposed on a surface of the proof mass, coils coupled to the proof mass) and one or more other components of the proof mass (e.g., a housing of the accelerometer system, an excitation ring of the accelerometer system). The unintended contact may affect the bias stability and/or scale factor within the accelerometer system, e.g., by altering a strain state of the accelerometer system and/or altering one or more components (e.g., coils) of the accelerometer system. The effects on the bias stability and/or scale factor of the accelerometer system may reduce the accuracy of the acceleration values determined by the accelerometer system, which may, for example, negatively affect the ability of a vehicle to accurately navigate based on the acceleration values from the accelerometer system.

The devices, systems, and techniques described in this disclosure reduce amplitude(s) of electric current(s) flowing through the coils for at least a threshold period of time during the startup of the accelerometer system. The reduction in the amplitude(s) of the electric current(s) may reduce the magnitudes of the Lorentz forces acting on the proof mass and, by extension, a magnitude of the displacement of the proof mass from the null position. The reduced magnitude of displacement may reduce or eliminate a risk of unintended contact between components within the accelerometer system. The devices, systems, and techniques described in this disclosure may increase the amplitude of the electric current(s) after the threshold period has elapsed to cause the accelerometer system to function at maximum capability.

In some examples, this disclosure describes an accelerometer system comprising: a first excitation ring; a second excitation ring; a first magnetic assembly comprising a first pole piece and a first magnet configured to generate a first magnetic flux; a second magnetic assembly comprising a second pole piece and a second magnet configured to generate a second magnetic flux; a proof mass assembly comprising: a proof mass between the first magnetic assembly and the second magnetic assembly; a first coil disposed around the first pole piece, wherein the first magnetic flux flows from the first excitation ring to the first pole piece across the first coil; and a second coil disposed around the second pole piece, wherein the second magnetic flux flows from the second excitation ring to the second pole piece across the second coil; and processing circuitry configured to: cause a first current to flow through the first coil to apply a first Lorentz force to the proof mass; cause a second current to flow through the second coil to apply a second Lorentz force to the proof mass; and limit a maximum amplitude of the first current and the second current for at least a threshold period of time.

In some examples, this disclosure describes a method comprising: causing, by a processing circuitry of an accelerometer system, a first current to flow through a first RC circuit and a first coil disposed around a first pole piece of a first magnetic assembly of the accelerometer system to apply a first Lorentz force to a proof mass of the accelerometer system, wherein the first RC circuit reduces a magnitude of the first current; causing, by the processing circuitry, a second current to flow through a second RC circuit and a second coil disposed around a second pole piece of a second magnetic assembly of the accelerometer system to apply a second Lorentz force to the proof mass, the second magnetic assembly being different from the first magnetic assembly, wherein the second RC circuit reduces a magnitude of the second current; determining, by the processing circuitry, that the first current has been flowing through the first RC circuit and the first pole piece for at least a threshold period of time; separating, by the processing circuitry and based on the determination that the first current has been flowing across the first RC circuit and the first pole piece for at least the threshold period of time, the first RC circuit from the first coil and the second RC circuit from the second coil; and causing, by the processing circuitry, the first current to bypass the first RC circuit and flow through the first coil and the second current to bypass the second RC circuit and flow through the second coil.

In some examples, this disclosure describes an accelerometer system comprising: a first excitation ring; a second excitation ring; a first magnetic assembly comprising a first pole piece and a first magnet configured to generate a first magnetic flux; a second magnetic assembly comprising a second pole piece and a second magnet configured to generate a second magnetic flux; a power source; a proof mass assembly comprising: a proof mass between the first magnetic assembly and the second magnetic assembly; a first coil disposed around the first pole piece, wherein the first magnetic flux flows from the first excitation ring to the first pole piece across the first coil; and a second coil disposed around the second pole piece, wherein the second magnetic flux flows from the second excitation ring to the second pole piece across the second coil; a first circuit coupling the power source to the first coil, the first circuit comprising a first resistor and a first switch coupled in series to the first resistor; a second circuit coupling the power source to the second coil, the second circuit comprising a second resistor and a second switch coupled in series to the second resistor; and processing circuitry configured to: cause a first current to flow from the power source and through the first circuit and the first coil to apply a first Lorentz force to the proof mass; cause a second current to flow from the power source and through the second circuit and the second coil to apply a second Lorentz force to the proof mass; determine that a threshold period of time has elapsed; based on a determination that the threshold period of time has elapsed, close the first switch and the second switch; and cause the first current to flow from the power source and through the first coil bypassing the first circuit; and cause the second current to flow from the power source and through the second coil bypassing the second circuit.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 3 is a block diagram illustrating an example electric circuit of the accelerometer system of FIG. 1.

Like reference characters denote like elements throughout the description and figures.

DETAILED DESCRIPTION

Figure 1:
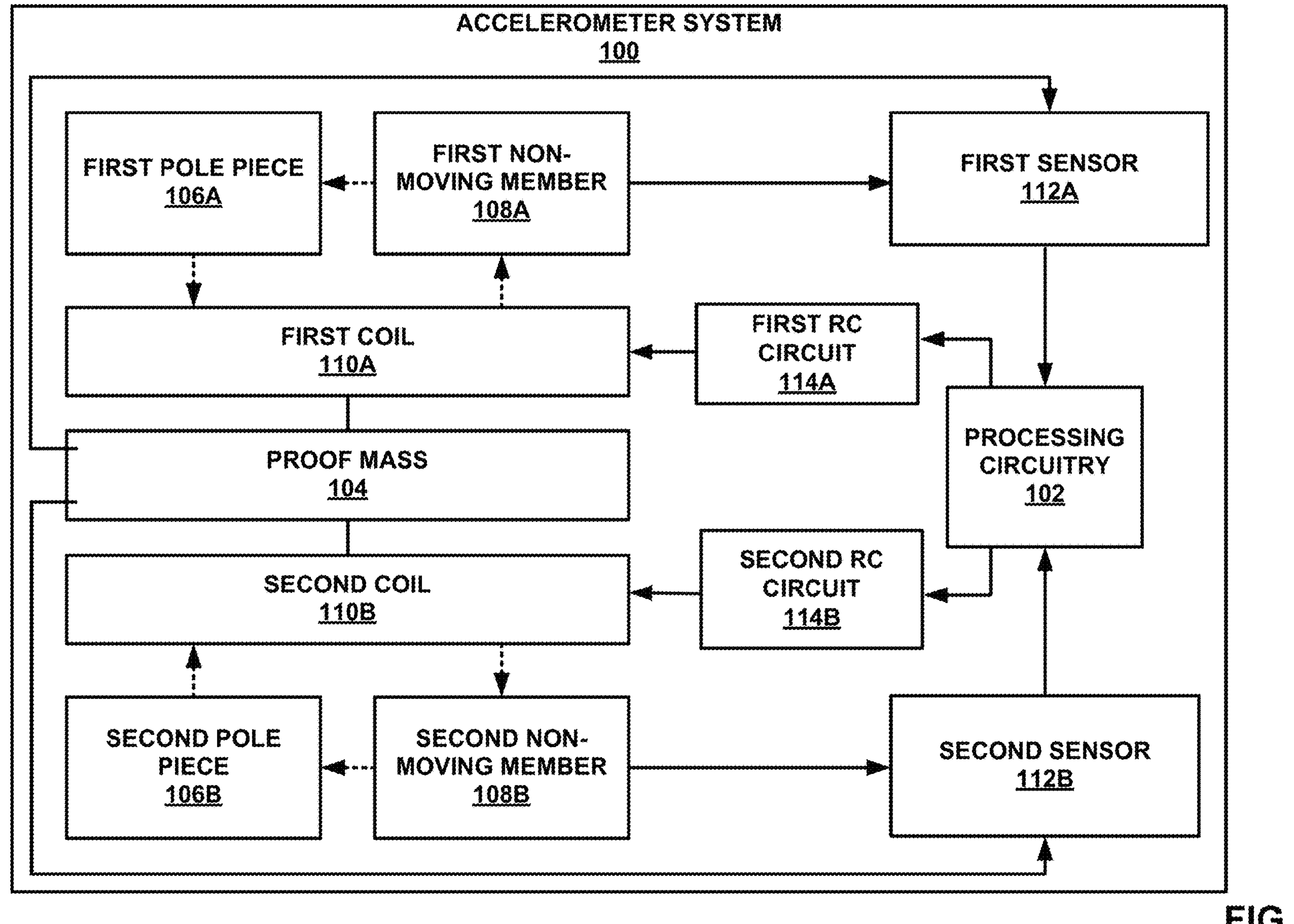
FIG. 1 is a block diagram illustrating an accelerometer system, in accordance with one or more techniques of this disclosure.

This disclosure is directed to devices, systems and techniques for determining an acceleration of an object using an accelerometer system. For example, the accelerometer system may be an electromagnetic accelerometer system configured to precisely measure acceleration values. The electromagnetic accelerometer system uses a combination of electrical signals and magnetic signals to determine the acceleration of the object. For example, the accelerometer system may include a magnetic pole piece, an electrical coil, a non-moving member, and a proof mass. A magnetic flux may travel from the pole piece, through the coil to the non-moving member, and back to the proof mass. An electrical current may flow through the coil. The accelerometer system may generate a Lorentz force based on the magnetic flux and the electrical current, the Lorentz force representing a servo effect which prevents a displacement of the proof mass.

In some cases, the accelerometer system is configured to measure the acceleration of the object in real-time or near real-time, such that processing circuitry may analyze the acceleration of the object over a period of time to determine a positional displacement of the object during the period of time. For example, the accelerometer system may be a part of an inertial navigation system (INS) for tracking a position of an object based, at least in part, on an acceleration of the object. Additionally, the accelerometer system may be located on or within the object such that the accelerometer system accelerates with the object. As such, when the object accelerates, the acceleration system (including the proof mass) accelerates with the object. Since acceleration over time is a derivative of velocity over time, and velocity over time is a derivative of position over time, processing circuitry may, in some cases, be configured to determine the position displacement of the object by performing a double integral of the acceleration of the object over the period of time. Determining a position of an object using the accelerometer system located on the object—and not using a navigation system external to the object (e.g., a global navigation satellite system (GNSS))—may be referred to as "dead reckoning."

In a balanced accelerometer system, the proof mass is maintained at the null position within the accelerometer system. While the accelerometer system is at rest or is undergoing standard operations, the proof mass is maintained at or substantially at the null position. During a startup of the accelerometer system, electric current(s) are introduced into coils within the accelerometer system which may interface with magnetic flux within the accelerometer system to apply Lorentz force(s) on the proof mass. The Lorentz force(s) may cause the proof mass to temporarily displace from the null position (alternatively referred to herein as an "overshoot"), e.g., until the accelerometer system adjusts the Lorentz force(s) to maintain the proof mass in the null position.

There may be a maximum distance between the proof mass and/or one or more components coupled to the proof mass and other components within the accelerometer system. If the magnitude of the displacement of the proof mass (e.g., during the startup of the accelerometer system) exceeds the maximum distance, there may be unintended contact between components within the accelerometer system. For example, there may be unintended contact between a coil of the accelerometer system and an excitation ring of the accelerometer system. The unintended contact may affect a bias and/or a scale factor of the accelerometer system, e.g., due to a change in strain state of the accelerometer system and/or alterations to one or more components of the accelerometer system (e.g., to the coils) due to the unintended contact). The effects on the bias and/or scale factor of the accelerometer system may reduce the accuracy of acceleration values outputted by the accelerometer system, which may reduce the ability of a vehicle to navigate accurately using the acceleration values.

The devices, systems, and techniques described herein reduce or eliminate the likelihood of unintended contact between components during the startup of the accelerometer system by reducing the amplitude(s) of electric current(s) traveling through the accelerometer system (e.g., through the coils) for at least a threshold period of time after the accelerometer system is started. The reduction in electric current amplitude(s) may reduce the magnitude of Lorentz force(s) acting on the proof mass and the magnitude of the displacement by the proof mass during the threshold period. After the threshold period has elapsed, the devices, systems, and techniques described herein may increase the amplitude(s) of electric current(s) to unrestricted level(s) to allow the accelerometer system to function at full capability.

FIG. 1 is a block diagram illustrating an accelerometer system 100, in accordance with one or more techniques of this disclosure. As illustrated in FIG. 1, accelerometer system 100 includes processing circuitry 102, proof mass 104, first pole piece 106A, second pole piece 106B (collectively, "pole pieces 106"), first non-moving member 108A, second non-moving member 108B (collectively, "non-moving members 108"), first coil 110A, second coil 110B (collectively, "coils 110"), first sensor 112A, second sensor 112B (collectively, "sensors 112"), first resistor-capacitor (RC) circuit 114A, and second RC circuit 114B (collectively, "RC circuits 114," "circuits 114"). First non-moving member 108A and second non-moving member 108B may be alternatively referred to herein as first excitation ring 108A and second excitation ring 108B, respectively.

Accelerometer system 100 is configured to determine an acceleration associated with an object (not illustrated in FIG. 1) based on a magnitude of one or more electrical signals delivered to coils 110, the electrical signals preventing proof mass 104 from displacing from a null position. For example, first sensor 112A may be configured to generate a first sense signal which indicates a size of a gap between proof mass 104 and first non-moving member 108A and second sensor 112B may be configured to generate a second sense signal which indicates a size of a gap between proof mass 104 and second non-moving member 108B. Processing circuitry 102 may generate a first electrical signal for delivery to first coil 110A based on the first sense signal and generate a second electrical signal for delivery to second coil 110B based on the second sense signal. The first electrical signal and the second electrical signal may induce one or more Lorentz forces which prevent the displacement of proof mass 104 from a null position. For example, the first electrical signal may induce a first Lorentz force and the second electrical signal may induce a second Lorentz force, wherein the first Lorentz force and the second Lorentz force interact with proof mass 104 to inhibit displacement of proof mass 104 from the null position.

A Lorentz force represents a force caused by an interaction of an electric fields and a magnetic field. For example, a Lorentz force may be defined by a cross-product of an electrical field and a magnetic field, where the direction of the Lorentz force depends on the direction of the electrical field and the direction of the magnetic field, and where the magnitude of the Lorentz force depends on the magnitude of the electrical field and the magnitude of the magnetic field.

Processing circuitry 102 may include one or more processors that are configured to implement functionality and/or process instructions for execution within accelerometer system 100. For example, processing circuitry 102 may be capable of processing instructions stored in a memory. Processing circuitry 102 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 102 may include any suitable structure, whether in hardware, software, firmware, or any combination thereof, to perform the functions ascribed herein to processing circuitry 102.

A memory (not illustrated in FIG. 1) may be configured to store information within accelerometer system 100 during operation. The memory may include a computer-readable storage medium or computer-readable storage device. In some examples, the memory includes one or more of a short-term memory (e.g., volatile memory) or a long-term memory (e.g., non-volatile memory). The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by processing circuitry 102.

Processing circuitry 102 may generate the first electrical signal and the second electrical signal as a part of a one or more negative feedback loops which maintain proof mass 104 in the null position. In some examples, processing circuitry 102 may cause a generator of system 100 to generate the first and second electrical signals, e.g., in the form of first and second electrical currents. Processing circuitry 102, first coil 110A, first sensor 112A, and/or first RC circuit 114A represent components of a first negative feedback loop. The first negative feedback loop may maintain a width of the gap between proof mass 104 and first non-moving member 108A at a first null width. For example, first sensor 112A may generate the first sense signal which indicates a capacitance value. The capacitance value is correlated with the width of the gap between proof mass 104 and first non-moving member 108A and delivers the first sense signal to processing circuitry 102. Processing circuitry 102 may generate (e.g., from the generator) the first electrical signal based on the first sense signal and deliver the first electrical signal to first coil 110A in order to maintain the capacitance value of the first sense signal at a first null capacitance value. By generating the first electrical signal in order to maintain the capacitance value of the first sense signal at the first null capacitance value, processing circuitry 102 maintains a width of the gap between the proof mass 104 and the first non-moving member 108A at the first null width.

Processing circuitry 102, second coil 110B, second sensor 112B, and second RC circuit 114B represent components of a second negative feedback loop. The second negative feedback loop may maintain a width of the gap between proof mass 104 and second non-moving member 108B at a second null width. For example, second sensor 112B may generate the second sense signal which indicates a second capacitance value. The capacitance value is correlated with the width of the gap between proof mass 104 and second non-moving member 108B and delivers the second sense signal to processing circuitry 102. Processing circuitry 102 may generate (e.g., from the generator) the second electrical signal based on the second sense signal and deliver the second electrical signal to second coil 110B in order to maintain the capacitance value of the second sense signal at a second null capacitance value. By generating the second electrical signal in order to maintain the second capacitance value of the second sense signal at the second null capacitance value, processing circuitry 102 maintains a width of the gap between the proof mass 104 and the second non-moving member 108B at the second null width.

Additionally, by maintaining the width of the gap between the proof mass 104 and the first non-moving member 108A at the first null width and maintaining the width of the gap between the proof mass 104 and the second non-moving member 108B at the second null width, processing circuitry 102 may maintain a position of proof mass 104 at a null position relative to non-moving members 108.

When an acceleration of accelerometer system 100 along a sense axis changes, the resulting acceleration force applied to proof mass 104 may change. Consequently, processing circuitry 102 may change a magnitude of the first electrical signal delivered to first coil 110A and the second electrical signal delivered to second coil 110B in order to prevent a displacement of proof mass 104 relative to non-moving members 108. In one example, the acceleration along the sense axis may increase from a first acceleration value to a second acceleration value. The processing circuitry 102 may change the magnitude of the first electrical signal and change the magnitude of the second electrical signal in order to account for the change in acceleration so that proof mass 104 remains in the null position relative to non-moving members 108. Processing circuitry 102 may determine the acceleration of accelerometer system 100 along the sense axis based on the magnitude of the first electrical signal delivered to first coil 110A and the magnitude of the second electrical signal delivered to second coil 110B.

In some examples, the magnitude of the first electrical signal delivered to first coil 110A is proportional to the acceleration along the sense axis. In some examples, the magnitude of the second electrical signal delivered to second coil 110B is proportional to the acceleration along the sense axis. As such, an increase in the magnitude of the first electrical signal may correspond to an increase in the acceleration along the sense axis and an increase in the magnitude of the second electrical signal may correspond to an increase in the acceleration along the sense axis. Alternatively, a decrease in the magnitude of the first electrical signal may correspond to a decrease in the acceleration along the sense axis and a decrease in the magnitude of the second electrical signal may correspond to a decrease in the acceleration along the sense axis.

Accelerometer system 100 may include a first magnetic flux loop and a second magnetic flux loop. The first magnetic flux loop may include first pole piece 106A, first non-moving member 108A, and first coil 110A. Within the first magnetic flux loop, a first magnetic flux may travel from first pole piece 106A through first coil 110A to first non-moving member 108A. The first magnetic flux then travels through first non-moving member 108A back to first pole piece 106A. In some examples, first pole piece 106A may include a first magnet which generates the first magnetic flux. The second magnetic flux loop may include second pole piece 106B, second non-moving member 108B, and second coil 110B. Within the second magnetic flux loop, a second magnetic flux may travel from second pole piece 106B through second coil 110B to second non-moving member 108B. The second magnetic flux then travels through second non-moving member 108B back to second pole piece 106B. In some examples, second pole piece 106B may include a second magnet which generates the second magnetic flux.

Accelerometer system 100 may represent a servo system which counter-balances acceleration along the sense axis with Lorentz forces parallel to the sense axis. For example, if accelerometer system 100 accelerates along the sense axis, the acceleration may apply an acceleration force to the proof mass 104, where the acceleration force is applied to proof mass 104 in an opposite direction of the acceleration of accelerometer system 100. Processing circuitry 102 delivers the first electrical signal to first coil 110A and delivers the second electrical signal to second coil 110B in order to generate one or more Lorentz forces which counter-balance the acceleration force resulting from the acceleration along the sense axis. That is, the one or more Lorentz forces are applied to proof mass 104 in an opposite direction to the acceleration force, such that proof mass 104 is not displaced from a null position by the acceleration force. The magnitude of the acceleration force changes based on the magnitude of the acceleration along the sense axis. As such, to prevent the displacement of proof mass 104 from the null position, processing circuitry 102 changes the magnitude of the first electrical signal delivered to first coil 110A and the magnitude of the second electrical signal delivered to second coil 110B in order to change the magnitude of the one or more Lorentz forces which counter-balance the acceleration signal.

Lorentz forces are forces which arise from an interaction between an electrical field and a magnetic field. As discussed above, accelerometer system 100 includes a first magnetic flux loop and a second magnetic flux loop. The first magnetic flux loop includes a passage of a first magnetic flux from the pole piece 106A to first non-moving member 108A through first coil 110A. The first electrical signal flows through first coil 110A. The first magnetic flux and the first electrical signal may cause a first Lorentz force to be applied to proof mass 104 in an opposite direction of the acceleration force applied to proof mass 104 due to the acceleration along the sense axis. Additionally, the second magnetic flux loop includes a passage of a second magnetic flux from the second pole piece 106B to second non-moving member 108B through second coil 110B. The second electrical signal flows through second coil 110B. The second magnetic flux and the second electrical signal may cause a second Lorentz force to be applied to proof mass 104 in an opposite direction of the acceleration force applied to proof mass 104 due to the acceleration along the sense axis.

When accelerometer system 100 is started, processing circuitry 102 may cause the first electrical signal to flow to first coil 110A through first RC circuit 114A and the second electrical signal to flow to second coil 110B through second RC circuit 114B. Each of RC circuits 114 may include one or more elements (e.g., resistors) configured to reduce an amplitude of an electric current of the respective electrical signal as the electrical signal flows through the RC circuit 114. The reduction in the amplitude of the electrical signals entering coils 110 may reduce the magnitudes of the Lorentz forces applied on proof mass 104. Reduction in the magnitudes of the Lorentz forces may limit a maximum displacement of proof mass 104 from the null position relative to non-moving members 108 and reduce or inhibit unintended contact between components within accelerometer system. For example, the reduced displacement of proof mass 104 from the null position may inhibit unintended contact between first coil 110A and first non-moving member 108A and/or between second coil 110B and second non-moving member 108B.

Processing circuitry 102 may monitor an amount of time that the electrical signals has flowed through the respective RC circuits 114. Processing circuitry 102 may monitor the amount of time via a timer of accelerometer system 100 (not illustrated in FIG. 1). After a threshold period of time has elapsed, processing circuitry 102 may cause the electrical signals to bypass RC circuits 114 and flow into the respective coils 110. In some examples, processing circuitry 102 may activate a switch within each of RC circuits 114 to cause the electrical signals to flow directly into coils 110 and bypass RC circuits 114. Processing circuitry 102 may cause the electrical signals to bypass RC circuits 114 to increase the sensing capabilities of sensors 112, e.g., by increasing the amplitude of the electrical signals flowing into coils 110.

After the threshold period of time has elapsed, there may be a reduced likelihood of unintended contact between components of accelerometer system 100 due to displacement of proof mass 104, e.g., due to processing circuitry 102 maintaining proof mass 104 at the null position. In such examples, increasing the amplitudes of the electrical signals (e.g., by bypassing RC circuits 114) may not increase or create a risk of unintended contact between components, e.g., due to processing circuitry 102 maintaining proof mass 104 at the null position.

Figure 2:
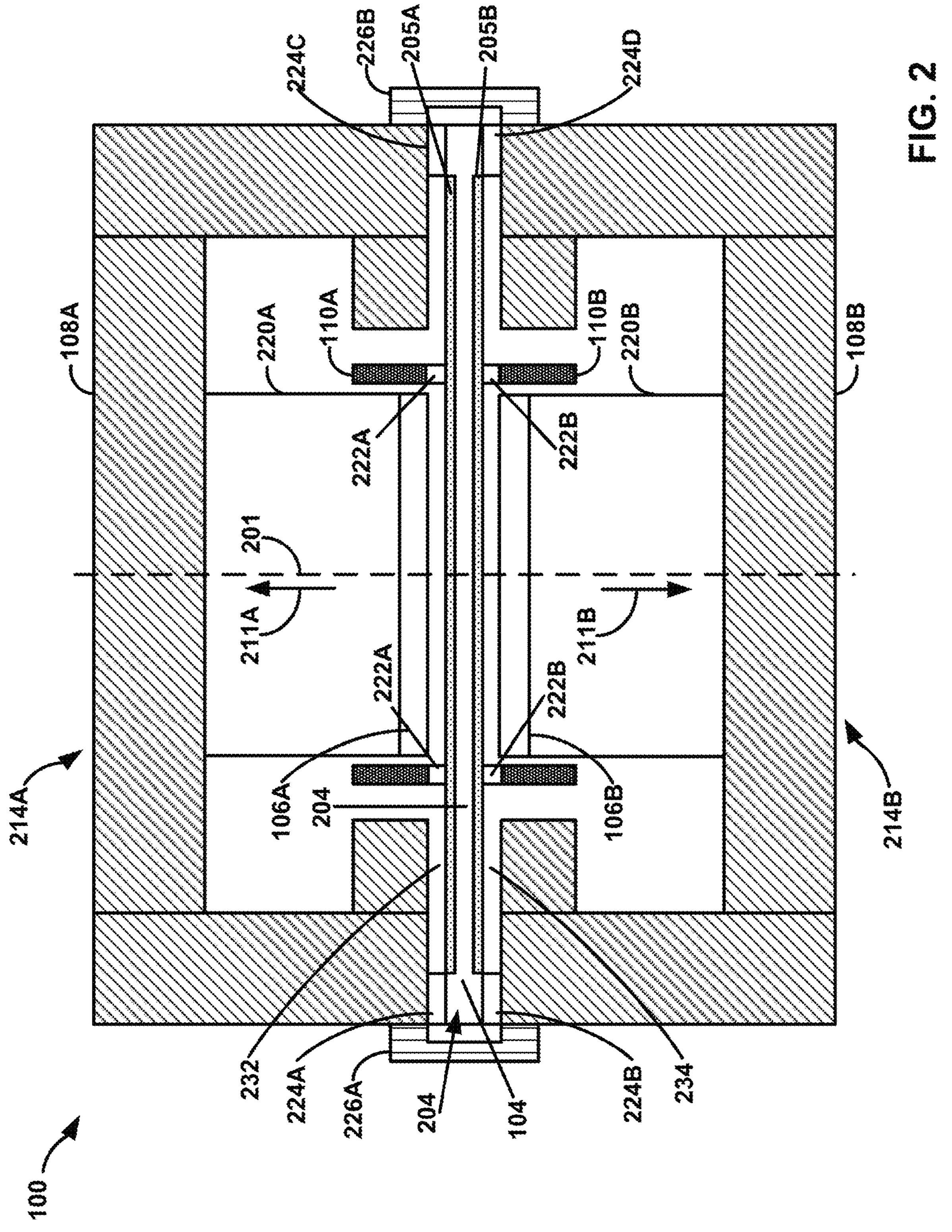
FIG. 2 is a conceptual diagram illustrating a side cutaway view of an example of the accelerometer system of FIG. 1.

FIG. 2 is a conceptual diagram illustrating a side cutaway view of accelerometer system 100, in accordance with one or more techniques of this disclosure. As seen in FIG. 2, accelerometer system 100 includes proof mass assembly 204, first pole piece 106A, second pole piece 106B, first non-moving member 108A, second non-moving member 108B, first coil 110A, second coil 110B, first magnet 220A, and second magnet 220B (collectively, "magnets 220"). Proof mass assembly 204 includes proof mass 104, first capacitive plate 205A, and second capacitive plate 205B (collectively, "capacitive plates 205"). In the example of FIG. 2, accelerometer system 100 further includes center pads 222A-222B (collectively, "center pads 222"), outer pads 224A-224D (collectively, "outer pads 224"), first band 226A, second band 226B (collectively, "bands 226"), first capacitive gap 232, and second capacitive gap 234. In the example of FIG. 2, accelerometer system 100 may include accelerometer supports 214A-214B (collectively, "accelerometer supports 214"), which may be formed by a combination of pole pieces 106, non-moving members 108, and magnets 220.

Accelerometer system 100 may be configured to sense an acceleration along sense axis 201. For example, accelerometer system 200 may be configured to sense an acceleration along sense axis 201 in a first direction 211A. In some cases, accelerometer system 200 precisely determines a magnitude of the acceleration along the sense axis 201 in the first direction 211A in real time or near-real time such that processing circuitry (not illustrated in FIG. 2) may track a position of accelerometer system 200 using dead reckoning. As seen in FIG. 2, proof mass assembly 204 is suspended between first non-moving member 108A and second non-moving member 108B by outer pads 224. First coil 110A and second coil 110B may be affixed to proof mass assembly 204 by center pads 222A and 222B, respectively. In some examples, the processing circuitry may receive a first sense signal indicative of a width of first capacitive gap 232 and receive a second sense signal indicative of a width of second capacitive gap 234. In turn, the processing circuitry may deliver (e.g., cause the generator to deliver) a first electrical signal to first coil 110A and deliver a second electrical signal to second coil 110B in order to prevent a displacement of proof mass 104 in response to an acceleration of accelerometer system 100 along sense axis 201. The magnitude of the first electrical signal and the magnitude of the second electrical signal may be correlated with the magnitude of the acceleration.

Non-moving members 108 may be attached to (e.g., clamped to) outer pads 224, securing proof mass assembly 204 between first non-moving member 108A and second non-moving member 108B. The term "non-moving member" may refer to a member representing a reference position by which a position of proof mass assembly 204 may be compared. In other words, the position of proof mass assembly 204 may represent a position of proof mass assembly 204 relative to non-moving members 108. In some examples, non-moving members 108 include dual metal materials, which may be part of a magnetic flux loop. In some examples, non-moving members 108 may be similar to stators of a variable capacitor.

Coils 110 may conduct electricity such that electrical signals flow through coils 110. For example, a first electrical signal may flow through a path of first coil 110A and a second electrical signal may flow through a path of second coil 110B. The path of each of coils 110 may define a circular, oval, square, triangular, or other polygonal path. Each of coils 110 extend fully around an outer surface of a corresponding pole piece of pole pieces 106, e.g., such that the first electrical signal flows around the outer surface of pole piece 106A through first coil 110A and the second electrical signal flows around the outer surface of pole piece 106B through second coil 110B.

Bands 226 are a metal pieces which fasten first non-moving member 108A to second non-moving member 108B. In some examples, bands 226 may be attached to (e.g., bonded with epoxy) non-moving members 108, when non-moving members 108 are attached to proof mass assembly 204 by outer pads 224. Accelerometer system 100 includes first capacitive gap 232 and second capacitive gap 234. First capacitive gap 232 represents a gap between first capacitive plate 205A and first non-moving member 108A, second capacitive gap 234 represents a gap between second capacitive plate 205B and second non-moving member 108B. First capacitive plate 205A may generate a first sense signal which indicates a first capacitance value. The first capacitance value is correlated with a width of first capacitive gap 232. Second capacitive plate 205B may generate a second sense signal which indicates a second capacitance value. The second capacitance value is correlated with a width of second capacitive gap 234. In this way, first capacitive plate 205A may represent first sensor 112A of FIG. 1 and second capacitive plate 205B may represent second sensor 112B of FIG. 1. Processing circuitry (not illustrating in FIG. 2) may receive the first sense signal and the second signal and control electrical signals delivered to coils 110 based on the first sense signal and the second sense signal.

A null width of first capacitive gap 232 may, in some examples, be defined by a width of outer pads 224. In some examples, the null width of first capacitive gap 232 is within a range from 0.0127 millimeters (mm) (e.g., about 0.0005 inches (in)) to 0.0635 mm (e.g., about 0.0025 in). A null width of second capacitive gap 234 may, in some examples, be defined by a width of outer pads 224. In some examples, the null width of second capacitive gap 234 is within a range from 0.0127 mm (e.g., about 0.0005 in) to 0.0635 mm (e.g., about 0.0025 in). When the width of first capacitive gap 232 is at the null width of first capacitive gap 232 and the width of second capacitive gap 234 is at the null width of second capacitive gap 234, proof mass 104 may be located at a null position. That is, proof mass 104 may be located at the null position such that the processing circuitry is configured to determine the acceleration along sense axis 201 based on the first electrical signal delivered to first coil 110A and the second electrical signal delivered to second coil 110B.

In some examples, first capacitive gap 232 may have a first capacitance value. The processing circuitry may detect the first capacitance value of first capacitive gap 232, which in a closed-loop differential capacitance configuration can be detected and used by the processing circuitry to determine the acceleration of accelerometer system 100. Additionally, second capacitive gap 234 may have a second capacitance value. The processing circuitry may detect the second capacitance value of second capacitive gap 234, which in a closed-loop differential capacitance configuration can be detected and used by the processing circuitry to determine the acceleration of accelerometer system 100. In some examples, an increase in a width of first capacitive gap 232 and a decrease in a width of second capacitive gap 234 may be indicative of an acceleration of accelerometer system 100 in first direction 211A. Conversely, an increase in the width of second capacitive gap 234 and a decrease in the width of first capacitive gap 232 may be indicative of an acceleration of accelerometer system 200 in the second direction 211B. The processing circuitry may deliver (e.g., from the generator) the first electrical signal to first coil 110A and deliver the second electrical signal to second coil 110B in order to counter-balance a displacement of proof mass 104 from the null position. The magnitude of the first electrical signal and the magnitude of the second electrical signal may be correlated with the magnitude of the acceleration along sense axis 201.

Magnets 220 are magnets for providing a magnetic field to drive magnetic circuits of magnets 220, pole pieces 106, coils 110, and non-moving members 108. In some examples, magnets 220 may be made of Alnico, samarium-cobalt, neodymium-iron-boron, or other such materials. In some examples, magnets 220 may receive the forces and/or strains transmitted from non-moving members 208 caused by the construction of accelerometer system 100. In some examples, magnets 220 may be part of a zero gauge configuration of accelerometer system 100.

Pole pieces 106 are magnetic structures that enables the magnetic field of magnets 220 to be focused and drive the magnetic circuit of magnets 220, pole pieces 106, coils 110, and non-moving members 108. For example, pole pieces 106 may be magnetic structures that enable the magnetic field of the magnet to turn a corner and flow through coils 110. In these examples, by allowing the magnetic field of magnets 220 to go through coils 110, the magnetic field of magnets 220 may enter non-moving members 108 and flow around to the opposite side of the magnet through non-moving members 108, and flow back through the magnet to the proof mass completing the magnetic circuit. For example, a first magnetic circuit may represent a magnetic flux loop in which a first magnetic flux passes from first magnet 220A to first pole piece 106A. The first magnetic flux travels from first pole piece 106A to first non-moving member 108A through first coil 110A. Then, the first magnetic flux travels through first non-moving member 108A back to first magnet 220A in order to complete the first magnetic circuit. A second magnetic circuit may represent a magnetic flux loop in which a second magnetic flux passes from second magnet 220B to second pole piece 106B. The second magnetic flux travels from second pole piece 106B to second non-moving member 108B through second coil 110B. Then, the second magnetic flux travels through second non-moving member 108B back to second magnet 220B in order to complete the second magnetic circuit.

In some examples, pole pieces 106 may be part of a zero gauge configuration of accelerometer system 100. In some examples, pole pieces 106 may be made from a permeable material such as invar, Mu Metal, Permalloy, or other such material.

In some examples, accelerometer system 100 may include coils 110 attached on each side of the proof mass. In some examples, accelerometer system 100 may include processing circuitry (not illustrated in FIG. 2) configured to deliver a first electrical signal and a second electrical signal to coils 110 in order to position proof mass 104 at the null position. In some examples, when accelerometer system 100 accelerates along sense axis 201, the processing circuitry may increase an electrical current magnitude of the first electrical signal and increase an electrical current magnitude of the second electrical signal to maintain the proof mass 104 at the null position. In this example, the electrical current magnitude of the first electrical signal and the electrical current magnitude of the second electrical signal are proportional to the magnitude of the acceleration along the sense axis 201.

Preventing proof mass 104 from displacing from the null position may be referred to herein as the "servo effect." In some examples, the processing circuitry may cause one or more Lorentz forces to counter-balance an acceleration force applied to proof mass 104 such that proof mass 104 does not move from the null position. This means that the processing circuitry is configured to adjust the one or more Lorentz forces in real time or near-real time such that the one or more Lorentz forces counter-balance the acceleration force applied to proof mass 104 at any given time, thus constantly maintaining the proof mass 104 at the null position. The electrical signals required to induce the one or more Lorentz forces may be generated by the processing circuitry based on the first sense signal received from first capacitive plate 205A and the second sense signal received from the second capacitive plate 205B.

Coils 110 may be mounted on either side of proof mass 104 of proof mass assembly 204. In some examples, processing circuitry may modify the current in coils 110 to servo proof mass 104 to maintain the null position. Any acceleration of accelerometer system 100 will momentarily move the proof mass of proof mass assembly 204 out of the plane of the null position and the increase in current required to maintain proof mass 104 in the null position is proportional to the magnitude of the acceleration of accelerometer system 100 along sense axis 201.

Although FIG. 2 illustrates accelerometer system 100 with a capacitive plate and a coil on both sides of proof mass assembly 204 to form a combined capacitive pick-off system, it is understood that accelerometer system 100 may function with a capacitor plate and a coil on only one side of proof mass assembly 204. Similarly, although FIG. 2 illustrates accelerometer system 100 with a non-moving member on both sides of proof mass assembly 204 to form the combined capacitive pick-off system, it is understood that accelerometer system 100 may function a non-moving member and a capacitor plate on the same side of proof mass assembly 204.

In some examples, during startup of accelerometer system 100, the Lorentz forces applied on proof mass 104 may cause proof mass to displace from the null position. During displacement of proof mass 104, proof mass 104 may close up one or more of first capacitive gap 232 or second capacitive gap 234 and cause unintended contact between components of accelerometer system 100. The unintended contact may include, but are not limited to, contact between proof mass 104 and one or more non-moving members 108, contact between at least one coil 110 and one or more non-moving members 108, contact between at least one capacitive plate 205 and one or more non-moving members 108, or the like.

During startup of accelerometer system 100, processing circuitry of accelerometer system 100 (not illustrated in FIG. 2) may reduce the amplitude of electric signals flowing though coils 110, e.g., via RC circuits 114 (not illustrated in FIG. 2). The reduction in electrical signal amplitude may reduce a maximum displacement of proof mass 104 from the null position and may cause accelerometer system 100 to maintain first capacitive gap 232 and second capacitive gap 234 during displacement of proof mass 104 (e.g., during startup of accelerometer system 100).

FIG. 3 is a block diagram illustrating an example electric circuit of accelerometer system 100 of FIG. 1. The electric circuit may include one or more components including, but are not limited to, sensor(s) 112, oscillator 304, detector 306, junction 308, integrator 310, current drive module 312, first negative feedback loop 301A, second negative feedback loop 301B (collectively, "negative feedback loops 301"), timer 322, and current feedback module 324. First negative feedback loop 301A may include first current source 314A, first RC circuit 114A including first switch 316A and first resistor 317A, and first coil 110A. Second negative feedback loop 301B may include second current source 314B, second RC Circuit 114B including second switch 316B and second resistor 317B, and second coil 110B. First negative feedback loop 301A and second negative feedback loop 301B may be electrically connected between current supply 318 (alternatively referred to herein as "power source 318") and ground 320.

Current drive module 312 may control the sensing of signals by accelerometer system 100 via sensor(s) 112 and the transmission of electrical signals (e.g., electric currents) from current supply 318 into negative feedback loops 301. Current drive module 312 may include at least a portion of processing circuitry 102.

Oscillator 304, detector 306, and sensor(s) 112 may determine capacitance values sensed by sensor(s) 112. Oscillator 304, detector 306, and sensor(s) 112 may form a circuit for calculating capacitance values of signals sensed by sensor(s) 112 based on an alternating current (AC) signal outputted by oscillator 304. Detector 306 may transmit the capacitance values to current drive module 312 through junction 308 and integrator 310.

Integrator 310 may receive inputs from detector 306 and current feedback module 324, integrates the input values, and transmits the output (e.g., an integration of the input values from detector 306) to current drive module 312. Current drive module 312 may determine an acceleration experienced by accelerometer system 100 and transmit the determined acceleration values as an output 302 out of accelerometer system 100. Current drive module 312 may also determine, based on received input values, the amplitudes of electrical signals to be transmitted into negative feedback loops 301, e.g., to maintain proof mass 104 (not illustrated in FIG. 3) in the null position. Current drive module 312 may then cause current supply 318 to transmit the electrical signals through negative feedback loops 301 and into ground 320 based on the determined amplitudes.

First current source 314A and second current source 314B (collectively, "current sources 314") may maintain a constant flow of electrical signals (e.g., electric current) through the respective negative feedback loops 301. As illustrated in FIG. 3, first RC circuit 114A may be electrically coupled in series with first coil 110A and second RC circuit 114B may be electrically coupled in series with second coil 110B. First RC circuit 114A may include first resistor 317A wired in parallel with first switch 316A. When first switch 316A is open, the electrical signal is forced to flow through first RC circuit 114A and across first resistor 317A, which reduced the amplitude of the electrical signal across first RC circuit 114A. When first switch 316A is closed, the electrical signal travels through first RC circuit 114A by traveling across first switch 316A and around first resistor 317A, e.g., due to the difference in electrical resistance between first switch 316A and first resistor 317A. In such examples, when first switch 316A is closed, the electrical signal travels across first RC circuit 114A while substantially maintaining a same amplitude.

Second RC circuit 114B may include second resistor 317B and second switch 316B. Second switch 316B and second resistor 317B may be wired in parallel and may function in a substantially similar manner, e.g., as discussed above with respect to first RC circuit 114A. First resistor 317A and second resistor 317B (collectively, "resistors 317") may define the same, substantially similar, or different resistance values. The resistance values for resistors 117 may be based on maximum amplitudes of the electrical signals traveling across each of coils 110 and/or a maximum displacement of proof mass 104 along either direction of sensing axis 201.

When both first switch 316A and second switch 316B (collectively, "switches 316") are open, the electrical signals flowing across both coils 110 are reduced in amplitude, which reduces the magnitude of the Lorentz forces acting on proof mass 104. Once switches 316 are open, the electrical signals flowing across coils 110 are not reduced in amplitude (e.g., from resistors 317). In such examples, current drive module 312 monitors and controls the electrical signals, e.g., as previously discussed herein, to maintain proof mass 104 at or substantially at a null position within accelerometer system 100.

Timer 322 of accelerometer system 100 monitors an amount of time that has elapsed since current drive module 312 introduced electrical signals across coils 110. After a threshold period of time has elapsed, timer 311 may transmit a signal to cause switches 316 to close, thereby causing the electrical signals to bypass resistors 317. The threshold period of time may be up to 20 milliseconds (ms). In some examples, processing circuitry 102 of accelerometer system 100 may adjust the threshold period of time, e.g., based on sensed signals from previous startups by accelerometer system 100.

In some examples, switches 316 are coupled to processing circuitry 102 of accelerometer system 100 (not illustrated in FIG. 3). In such examples, processing circuitry 102 may open or close switches 316 to control the amplitude of the electrical signals flowing across coils 110, e.g., after the threshold period has elapsed. Processing circuitry 102 may open or close switches 316 in response to receiving an external input (e.g., from a vehicle computing system), based on the sensed signals, based on indications of deviations and/or inaccuracies in output 302, or the like.

Figures 4, 5:
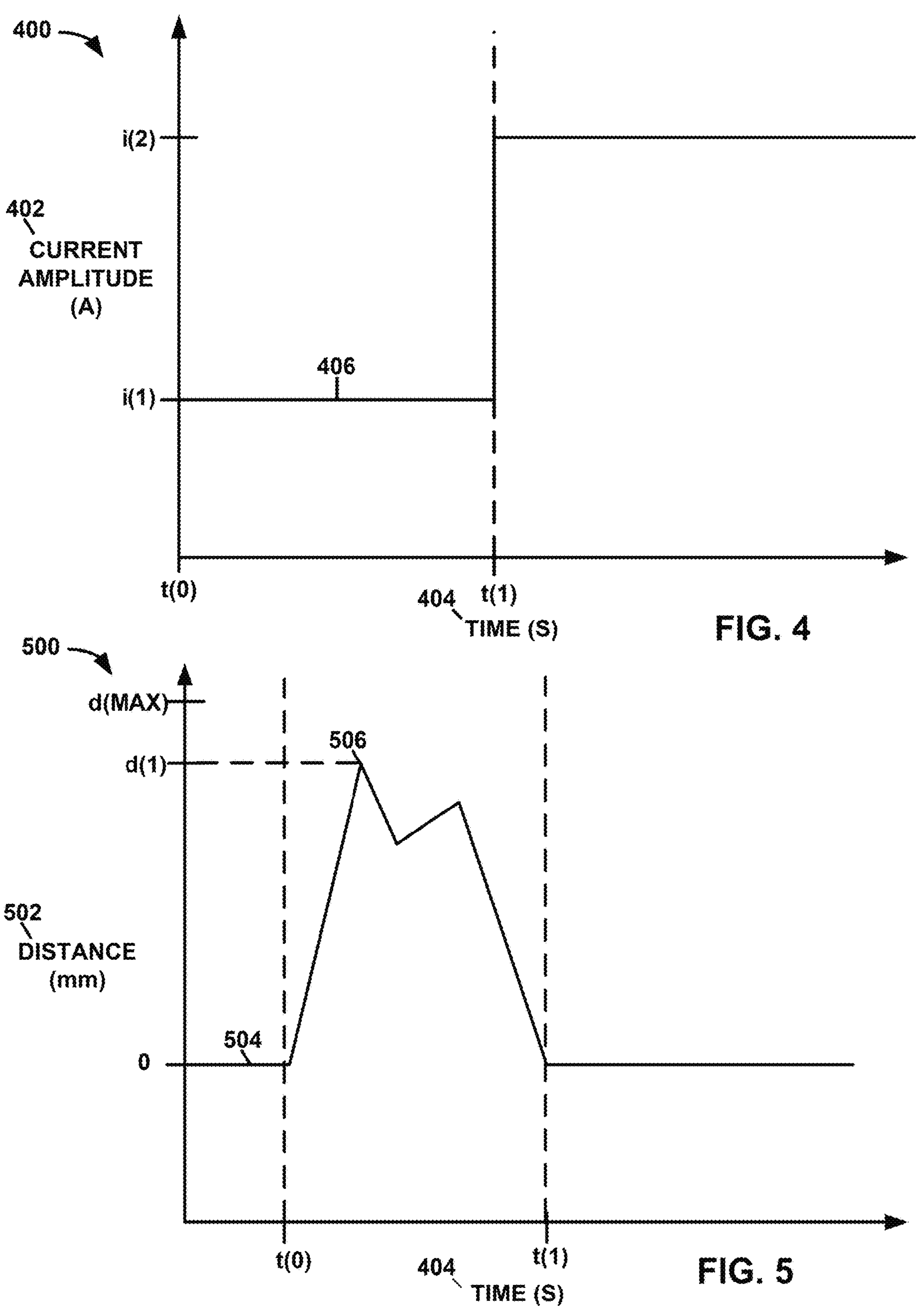
FIG. 4 is a plot diagram illustrating a graph of an example electrical signal flowing through a coil of the accelerometer system of FIG. 1 over time.
FIG. 5 is a plot diagram illustrating a graph of an example displacement of a proof mass within the accelerometer system of FIG. 1 in response to the example current illustrated in the graph of FIG. 4.

FIG. 4 is a plot diagram illustrating a graph 400 of an example electrical signal 406 flowing through a coil (e.g., one of coils 110) of accelerometer system 100 of FIG. 1 over time 404. Electrical signal 406 may be represented as a current amplitude 402 over time 404.

As illustrated in FIG. 4, accelerometer system 100 may reduce current amplitude 402 (measured in milliamperes (mA)) of electrical signal 406 to i(1) for at least a threshold period of time from the start of accelerometer system 100 (i.e., when time 404 is at t(0) to t(1)). t(1) may be up to 20 ms. During the threshold time period up to t(1), accelerometer system 100 may maintain switches 316 of RC circuits 114 in the open position, thereby forcing electrical signal 406 to flow across one or more of resistors 317 in RC circuits 114 and reducing current amplitude 402 of electrical signal 406 to i(2) or less.

After the threshold period of time has elapsed (e.g., t(1)), accelerometer system 100 may close switches 316 of RC circuits 114, which may cause electrical signal 406 to bypass resistors 317. As illustrated in FIG. 4, current amplitude 402 of electrical signal 406 may increase from i(1) to i(2) after t(1). i(1) may be up to about 30 mA. i(2) may be up to about 95 mA (e.g., up to about 91 mA).

FIG. 5 is a plot diagram illustrating a graph 500 of an example displacement 504 of proof mass 104 within accelerometer system 100 of FIG. 1 in response to the example electrical signal 406 illustrated in graph 400.

As illustrated in FIG. 5, prior to a start of accelerometer system 100 (e.g., prior to t(0), proof mass 104 rests at the null position within accelerometer system 100, which may be represented as distance 502 of displacement 504 being at or substantially around 0 millimeters (mm). As accelerometer system 100 transmits electrical signal 406 to coils 110 at a reduced amplitude (e.g., at i(1)) between t(0) and t(1), proof mass 104 may displace from null position (e.g., the distance 502 of displacement 504 increases). During the threshold time period (e.g., between t(0) and t(1)), proof mass 104 may displace a maximum distance d(1) at point 506 along displacement 504. A maximum distance d(MAX) may correspond to a displacement distance for proof mass 104 where components of accelerometer system 100 begins to come into unintended contact (e.g., where coils 110 unintentionally contact non-moving members 108). The maximum distance d(MAX) may be up to 0.00191 centimeters (cm) (e.g., up to 0.0075 inches (in)). The reduced amplitude of electrical signal 406 limits a magnitude of displacement 504 of proof mass 104 at point 506 to d(2), which is less than maximum distance d(MAX), thereby inhibiting unintended contact between components of accelerometer system 100.

After point 506, processing circuitry 102 may adjust the position of proof mass 104 within accelerometer system 100, e.g., by adjusting the amplitudes of electrical signal 406 over time. Processing circuitry 102 may adjust electrical signal 406 until proof mass 104 is returned and maintained in the null position. After t(1), processing circuitry 102 may continue to maintain proof mass 104 in the null position. Processing circuitry 102 may continue to maintain proof mass 104 in the null position as switches 316 are closed, e.g., to un-restrict the amplitudes of electrical signal 406.

Figure 6:
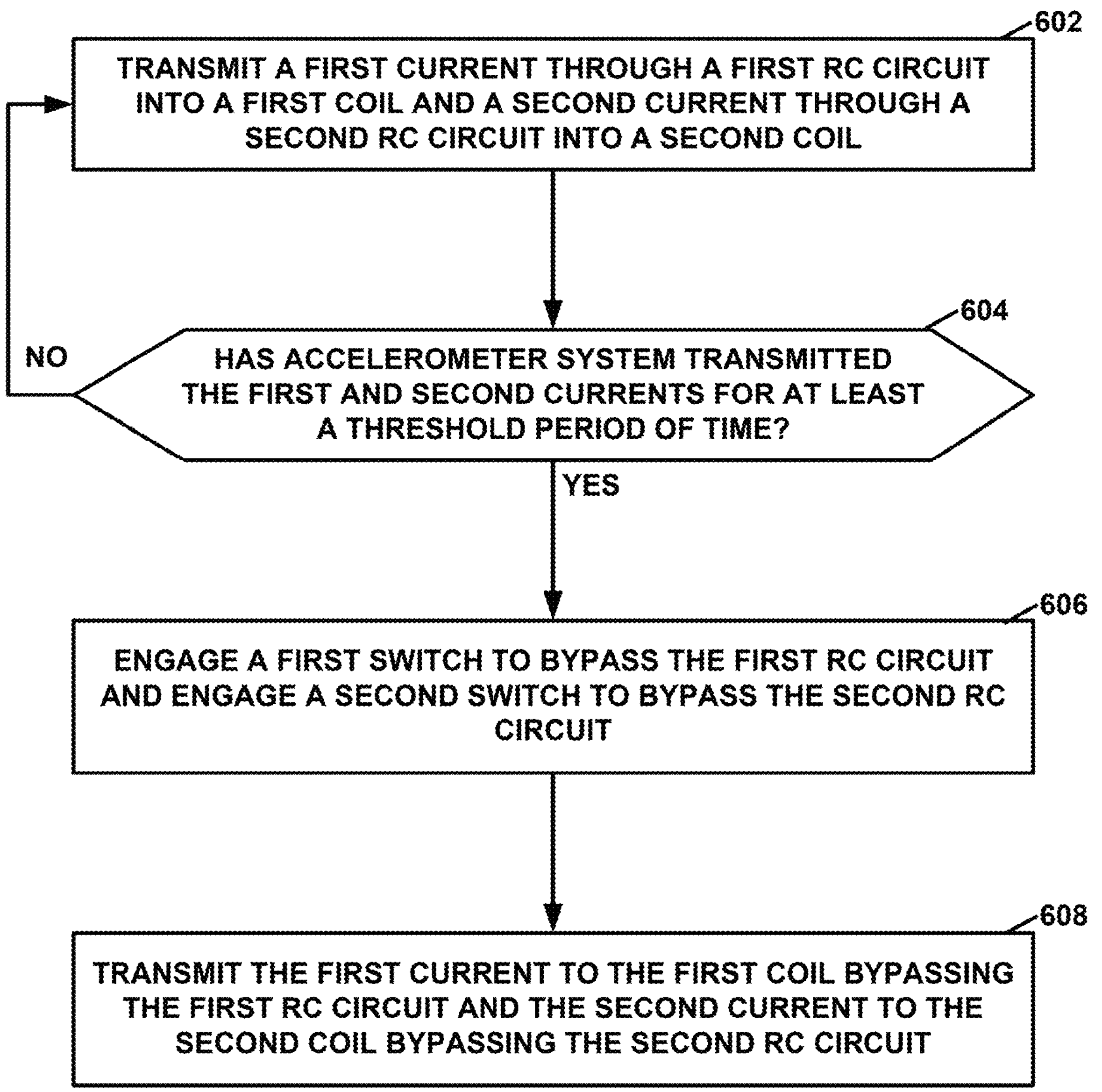
FIG. 6 is a flow chart illustrating an example technique for determining an acceleration using the electromagnetic accelerometer of FIG. 1.

FIG. 6 is a flow chart illustrating an example technique controlling a displacement of a proof mass within accelerometer system 100 of FIG. 1. FIG. 6 is described with respect to accelerometer system 100, of FIG. 1. However, the techniques of FIG. 6 may be performed by different components of accelerometer system 100 or by additional or alternative devices.

Processing circuitry 102 may transmit (e.g., from the generator) a first current (e.g., a first electrical signal) through first RC circuit 114A into first coil 110A and transmit a second current (e.g., a second electrical signal) through second RC circuit 114B into second coil 110B (602). The second current may be the same as or different from the first current. For example, the second current may define a same or different amplitude as the first current. First negative feedback loop 301A containing first RC circuit 114A and first coil 110A, may be wired in series or in parallel with second negative feedback loop 301B containing second RC circuit 114B and second coil 110B.

As the first current and second current flows through the respective RC circuits 114, the currents flow across resistors 317 within the respective RC circuits 114, which may reduce the amplitudes of the first and second currents. Resistors 317 may reduce the amplitudes of each of the first and second currents by a same or different amount. Reduction of the amplitudes of the first and second currents reduces magnitudes of Lorentz forces applied on proof mass 104 of accelerometer system 100 due to the first and second currents flowing through first coil 110A and second coil 110B, respectively. The reduced Lorentz forces may reduce a maximum displacement of proof mass 104 from the null position in accelerometer system 100 due to the application of the Lorentz forces. The reduced maximum displacement of proof mass 104 may be less than or equal to a threshold displacement. The threshold displacement may up to 0.0191 cm. The reduced maximum displacement of proof mass 104 may inhibit unintended contact between components within accelerometer system 100 (e.g., between coils 110 and non-moving member 108), which may help maintain the bias and scale factor of accelerometer system 100 and increase an accuracy of accelerometer system 100.

Processing circuitry 102 may determine whether accelerometer system 100 has transmitted the first and second currents for at least a threshold period of time (604). Processing circuitry 102 may monitor a transmission duration for first and second currents via timer 322. Based on a determination that accelerometer system 100 has transmitted the first and second currents for less than the threshold period of time ("NO" branch of 604), processing circuitry 102 may continue to transmit the first current through first RC circuit 114A and first coil 110A and transmit the second current through second RC circuit 114B and second coil 110B (602).

Based on a determination that accelerometer system 100 has transmitted the first and second currents for at least the threshold period of time ("YES" branch of 604), processing circuitry 102 may engage a first switch 316A to bypass first RC circuit 114A and engage a second switch 316B to bypass second RC circuit 114B (606). First switch 316A may be coupled in parallel to first resistor 317A of first RC circuit 114A and second switch 316B may be coupled in parallel to second resistor 317B of second RC circuit 114B. When processing circuitry 102 engages switches 316 (e.g., closes switches 316), each RC circuit 114 defines a second path of lower resistance through the respective RC circuit 114 and around resistor 317 within the RC circuit 114. Processing circuitry 102 may close switches 316 to bypass resistors 317 within RC circuits 114.

Processing circuitry 102 may transmit the first current to first coil 110A bypassing first RC circuit 114A and transmit the second current to second coil 110B bypassing second RC circuit 114B (608). Processing circuitry 102 may transmit the first and second currents to coils 110 without causing the amplitudes of the first and second currents to be reduced (e.g., by resistors 317 of RC circuits 114). Transmitting first and second currents at un-restricted amplitudes may increase the Lorentz forces applied on proof mass 104, which may facilitate the sensing of signals by sensor(s) 112 and increase the sensing capabilities of accelerometer system 100.

This disclosure describes the following examples:

Example 1: an accelerometer system comprising: a first excitation ring; a second excitation ring; a first magnetic assembly comprising a first pole piece and a first magnet configured to generate a first magnetic flux; a second magnetic assembly comprising a second pole piece and a second magnet configured to generate a second magnetic flux; a proof mass assembly comprising: a proof mass between the first magnetic assembly and the second magnetic assembly; a first coil disposed around the first pole piece, wherein the first magnetic flux flows from the first excitation ring to the first pole piece across the first coil; and a second coil disposed around the second pole piece, wherein the second magnetic flux flows from the second excitation ring to the second pole piece across the second coil; and processing circuitry configured to: cause a first current to flow through the first coil to apply a first Lorentz force to the proof mass; cause a second current to flow through the second coil to apply a second Lorentz force to the proof mass; and limit a maximum amplitude of the first current and the second current for at least a threshold period of time.

Example 2: the accelerometer system of example 1, wherein to limit the maximum amplitude of the first current and the second current for at least the threshold period of time, the processing circuitry is further configured to: cause the first current to flow through the first coil at a first amplitude, the first amplitude being less than or equal to the maximum amplitude; cause the second current to flow through the second coil at a second amplitude, the second amplitude being less than or equal to the maximum amplitude; determine that the first current has flown through the first coil for at least the threshold period of time; and based on a determination that determine that the first current has flown through the first coil for at least the threshold period of time, cause the first current to flow through the first coil at a third amplitude and the second current to flow through the second coil at a fourth amplitude, the third amplitude being greater than or equal to the first amplitude and the fourth amplitude being greater than or equal to the second amplitude.

Example 3: the accelerometer system of any of examples 1 or 2, further comprising: a generator; a first circuit coupled to the generator and the first coil, the first circuit comprising a first switch and a first resistor; and a second circuit coupled to the generator and the second coil, the second circuit comprising a second switch and a second resistor; and wherein to limit the maximum amplitude of the first current and the second current for at least the threshold period of time, the processing circuitry is configured to: cause the generator to transmit the first current through the first resistor to the first coil for a first time period; cause the generator to transmit the second current through the second resistor to the second coil for the first time period; determine that a duration of the first time period is greater than or equal to the threshold period of time; and based on the determination, close the first switch to bypass the first circuit and close the second switch to bypass the second circuit.

Example 4: the accelerometer system of any of examples 1-3, wherein the proof mass is disposed at a null position within the accelerometer system, and wherein limiting the maximum amplitude of the first current and the second current reduces a maximum displacement of the proof mass from the null position.

Example 5: the accelerometer system of example 4, wherein a reduced maximum displacement of the proof mass is up to 0.00191 centimeters (cm).

Example 6: the accelerometer system of example 4, wherein a first surface of the proof mass is separated from the first excitation ring by a first distance, and wherein a reduced maximum displacement of the proof mass is a second distance, the second distance being less than the first distance.

Example 7: the accelerometer system of any of examples 1-6, wherein the threshold period of time is up to 20 milliseconds (ms).

Example 8: the accelerometer system of any of examples 1-7, wherein the processing circuitry is configured to limit the maximum amplitude of the first current and the second current for at least the threshold period of time after a startup of the accelerometer system.

Example 9: the accelerometer system of any of examples 1-9, wherein limiting the limit the maximum amplitude of the first current and the second current for at least the threshold period of time inhibits contact between the proof mass and a housing of the accelerometer system during the threshold period of time.

Example 10: a method comprising: causing, by a processing circuitry of an accelerometer system, a first current to flow through a first RC circuit and a first coil disposed around a first pole piece of a first magnetic assembly of the accelerometer system to apply a first Lorentz force to a proof mass of the accelerometer system, wherein the first RC circuit reduces a magnitude of the first current; causing, by the processing circuitry, a second current to flow through a second RC circuit and a second coil disposed around a second pole piece of a second magnetic assembly of the accelerometer system to apply a second Lorentz force to the proof mass, the second magnetic assembly being different from the first magnetic assembly, wherein the second RC circuit reduces a magnitude of the second current; determining, by the processing circuitry, that the first current has been flowing through the first RC circuit and the first pole piece for at least a threshold period of time; separating, by the processing circuitry and based on the determination that the first current has been flowing across the first RC circuit and the first pole piece for at least the threshold period of time, the first RC circuit from the first coil and the second RC circuit from the second coil; and causing, by the processing circuitry, the first current to bypass the first RC circuit and flow through the first coil and the second current to bypass the second RC circuit and flow through the second coil.

Example 11: the method of example 10, wherein the first RC circuit reduces a maximum amplitude of the first current to a first amplitude, wherein causing the first current to flow through the first RC circuit and the first coil comprises causing, by the processing circuitry, the first current to flow through the first coil at the first amplitude, and wherein causing the first current to bypass the first RC circuit and flow through the first coil comprises causing by the processing circuitry, the first current to flow through the first coil at a second amplitude, the second amplitude being greater than the first amplitude.

Example 12: the method of example 11, wherein the second amplitude is up to the maximum amplitude of the first current, and wherein the second RC circuit reduces the maximum amplitude of the second current to a second amplitude.

Example 13: the method of any of examples 10-12, wherein the first RC circuit comprises a first resistor and a first switch coupled in series with the first resistor, and wherein the second RC circuit comprises a second resistor and a second switch coupled in series to the second resistor.

Example 14: the method of example 13, wherein separating the first RC circuit from the first coil comprises closing, by the processing circuitry, the first switch, and wherein separating the second RC circuit from the second coil comprises closing, by the processing circuitry, the second switch.

Example 15: the method of any of examples 10-14, wherein causing the first current to flow through the first RC circuit and the first coil to apply the first Lorentz force to the proof mass and causing the second current to flow through the second RC circuit and the second coil to apply the second Lorentz force to the proof mass limits a maximum displacement of the proof mass within the accelerometer system from a null position to less than a threshold displacement.

Example 16: the method of example 15, wherein the threshold displacement is up to 0.00191 centimeters (cm).

Example 17: the method of any of examples 10-16, wherein the threshold period of time is up to 20 milliseconds (ms).

Example 18: the method of any of examples 10-17, wherein determining that the first current has been flowing through the first RC circuit and the first pole piece for at least the threshold period of time comprises determining that the first current has been flowing through the first RC circuit and the first pole piece for at least the threshold period of time since a startup of the accelerometer system.

Example 19: an accelerometer system comprising: a first excitation ring; a second excitation ring; a first magnetic assembly comprising a first pole piece and a first magnet configured to generate a first magnetic flux; a second magnetic assembly comprising a second pole piece and a second magnet configured to generate a second magnetic flux; a power source; a proof mass assembly comprising: a proof mass between the first magnetic assembly and the second magnetic assembly; a first coil disposed around the first pole piece, wherein the first magnetic flux flows from the first excitation ring to the first pole piece across the first coil; and a second coil disposed around the second pole piece, wherein the second magnetic flux flows from the second excitation ring to the second pole piece across the second coil; a first circuit coupling the power source to the first coil, the first circuit comprising a first resistor and a first switch coupled in series to the first resistor; a second circuit coupling the power source to the second coil, the second circuit comprising a second resistor and a second switch coupled in series to the second resistor; and processing circuitry configured to: cause a first current to flow from the power source and through the first circuit and the first coil to apply a first Lorentz force to the proof mass; cause a second current to flow from the power source and through the second circuit and the second coil to apply a second Lorentz force to the proof mass; determine that a threshold period of time has elapsed; based on a determination that the threshold period of time has elapsed, close the first switch and the second switch; and cause the first current to flow from the power source and through the first coil bypassing the first circuit; and cause the second current to flow from the power source and through the second coil bypassing the second circuit.

Example 20: the accelerometer system of example 19, wherein the proof mass is disposed at a null position within the accelerometer system, and wherein causing the first current to flow from the power source and through the first circuit and the first coil and causing the second current to flow from the power source and through the second circuit and the second coil reduces a maximum displacement of the proof mass from the null position.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. An accelerometer system comprising:

a first excitation ring;

a second excitation ring;

a first magnetic assembly comprising a first pole piece and a first magnet configured to generate a first magnetic flux;

a second magnetic assembly comprising a second pole piece and a second magnet configured to generate a second magnetic flux;

a proof mass assembly comprising:

a proof mass between the first magnetic assembly and the second magnetic assembly;

a first coil disposed around the first pole piece, wherein the first magnetic flux flows from the first excitation ring to the first pole piece across the first coil; and a second coil disposed around the second pole piece, wherein the second magnetic flux flows from the second excitation ring to the second pole piece across the second coil; and processing circuitry configured to:

cause a first current to flow through the first coil to apply a first Lorentz force to the proof mass;

cause a second current to flow through the second coil to apply a second Lorentz force to the proof mass; and limit a maximum amplitude of the first current and the second current for at least a threshold period of time.

2. The accelerometer system of claim 1, wherein to limit the maximum amplitude of the first current and the second current for at least the threshold period of time, the processing circuitry is further configured to:

cause the first current to flow through the first coil at a first amplitude, the first amplitude being less than or equal to the maximum amplitude;

cause the second current to flow through the second coil at a second amplitude, the second amplitude being less than or equal to the maximum amplitude;

determine that the first current has flown through the first coil for at least the threshold period of time; and based on a determination that determine that the first current has flown through the first coil for at least the threshold period of time, cause the first current to flow through the first coil at a third amplitude and the second current to flow through the second coil at a fourth amplitude, the third amplitude being greater than or equal to the first amplitude and the fourth amplitude being greater than or equal to the second amplitude.

3. The accelerometer system of claim 1, further comprising:

a generator;

a first circuit coupled to the generator and the first coil, the first circuit comprising a first switch and a first resistor; and a second circuit coupled to the generator and the second coil, the second circuit comprising a second switch and a second resistor; and wherein to limit the maximum amplitude of the first current and the second current for at least the threshold period of time, the processing circuitry is configured to:

cause the generator to transmit the first current through the first resistor to the first coil for a first time period;

cause the generator to transmit the second current through the second resistor to the second coil for the first time period;

determine that a duration of the first time period is greater than or equal to the threshold period of time; and based on the determination, close the first switch to bypass the first circuit and close the second switch to bypass the second circuit.

4. The accelerometer system of claim 1, wherein the proof mass is disposed at a null position within the accelerometer system, and wherein limiting the maximum amplitude of the first current and the second current reduces a maximum displacement of the proof mass from the null position.

5. The accelerometer system of claim 4, wherein a reduced maximum displacement of the proof mass is up to 0.00191 centimeters (cm).

6. The accelerometer system of claim 4, wherein a first surface of the proof mass is separated from the first excitation ring by a first distance, and wherein a reduced maximum displacement of the proof mass is a second distance, the second distance being less than the first distance.

7. The accelerometer system of claim 1, wherein the threshold period of time is up to 20 milliseconds (ms).

8. The accelerometer system of claim 1, wherein the processing circuitry is configured to limit the maximum amplitude of the first current and the second current for at least the threshold period of time after a startup of the accelerometer system.

9. The accelerometer system of claim 1, wherein limiting the limit the maximum amplitude of the first current and the second current for at least the threshold period of time inhibits contact between the proof mass and a housing of the accelerometer system during the threshold period of time.

10. A method comprising:

causing, by a processing circuitry of an accelerometer system, a first current to flow through a first RC circuit and a first coil disposed around a first pole piece of a first magnetic assembly of the accelerometer system to apply a first Lorentz force to a proof mass of the accelerometer system, wherein the first RC circuit reduces a magnitude of the first current;

causing, by the processing circuitry, a second current to flow through a second RC circuit and a second coil disposed around a second pole piece of a second magnetic assembly of the accelerometer system to apply a second Lorentz force to the proof mass, the second magnetic assembly being different from the first magnetic assembly, wherein the second RC circuit reduces a magnitude of the second current;

determining, by the processing circuitry, that the first current has been flowing through the first RC circuit and the first pole piece for at least a threshold period of time;

separating, by the processing circuitry and based on the determination that the first current has been flowing across the first RC circuit and the first pole piece for at least the threshold period of time, the first RC circuit from the first coil and the second RC circuit from the second coil; and causing, by the processing circuitry, the first current to bypass the first RC circuit and flow through the first coil and the second current to bypass the second RC circuit and flow through the second coil.

11. The method of claim 10, wherein the first RC circuit reduces a maximum amplitude of the first current to a first amplitude, wherein causing the first current to flow through the first RC circuit and the first coil comprises causing, by the processing circuitry, the first current to flow through the first coil at the first amplitude, and wherein causing the first current to bypass the first RC circuit and flow through the first coil comprises causing by the processing circuitry, the first current to flow through the first coil at a second amplitude, the second amplitude being greater than the first amplitude.

12. The method of claim 11, wherein the second amplitude is up to the maximum amplitude of the first current, and wherein the second RC circuit reduces the maximum amplitude of the second current to a second amplitude.

13. The method of claim 10, wherein the first RC circuit comprises a first resistor and a first switch coupled in series with the first resistor, and wherein the second RC circuit comprises a second resistor and a second switch coupled in series to the second resistor.

14. The method of claim 13, wherein separating the first RC circuit from the first coil comprises closing, by the processing circuitry, the first switch, and wherein separating the second RC circuit from the second coil comprises closing, by the processing circuitry, the second switch.

15. The method of claim 10, wherein causing the first current to flow through the first RC circuit and the first coil to apply the first Lorentz force to the proof mass and causing the second current to flow through the second RC circuit and the second coil to apply the second Lorentz force to the proof mass limits a maximum displacement of the proof mass within the accelerometer system from a null position to less than a threshold displacement.

16. The method of claim 15, wherein the threshold displacement is up to 0.00191 centimeters (cm).

17. The method of claim 10, wherein the threshold period of time is up to 20 milliseconds (ms).

18. The method of claim 10, wherein determining that the first current has been flowing through the first RC circuit and the first pole piece for at least the threshold period of time comprises determining that the first current has been flowing through the first RC circuit and the first pole piece for at least the threshold period of time since a startup of the accelerometer system.

19. An accelerometer system comprising:

a first excitation ring;

a second excitation ring;

a first magnetic assembly comprising a first pole piece and a first magnet configured to generate a first magnetic flux;

a second magnetic assembly comprising a second pole piece and a second magnet configured to generate a second magnetic flux;

a power source;

a proof mass assembly comprising:

a proof mass between the first magnetic assembly and the second magnetic assembly;

a first coil disposed around the first pole piece, wherein the first magnetic flux flows from the first excitation ring to the first pole piece across the first coil; and a second coil disposed around the second pole piece, wherein the second magnetic flux flows from the second excitation ring to the second pole piece across the second coil;

a first circuit coupling the power source to the first coil, the first circuit comprising a first resistor and a first switch coupled in series to the first resistor;

a second circuit coupling the power source to the second coil, the second circuit comprising a second resistor and a second switch coupled in series to the second resistor; and processing circuitry configured to:

cause a first current to flow from the power source and through the first circuit and the first coil to apply a first Lorentz force to the proof mass;

cause a second current to flow from the power source and through the second circuit and the second coil to apply a second Lorentz force to the proof mass;

determine that a threshold period of time has elapsed;

based on a determination that the threshold period of time has elapsed, close the first switch and the second switch; and cause the first current to flow from the power source and through the first coil bypassing the first circuit; and cause the second current to flow from the power source and through the second coil bypassing the second circuit.

20. The accelerometer system of claim 19, wherein the proof mass is disposed at a null position within the accelerometer system, and wherein causing the first current to flow from the power source and through the first circuit and the first coil and causing the second current to flow from the power source and through the second circuit and the second coil reduces a maximum displacement of the proof mass from the null position.

* * * * *